(12) United States Patent
Wang et al.

(10) Patent No.: US 10,836,030 B2
(45) Date of Patent: Nov. 17, 2020

(54) BIONIC ROBOT AND SPINE APPARATUS THEREOF

(71) Applicant: China Jiliang University, Zhejiang (CN)

(72) Inventors: Binrui Wang, Zhejiang (CN); Ke Zhang, Zhejiang (CN); Yinglian Jin, Zhejiang (CN); Zhenwu Guo, Zhejiang (CN)

(73) Assignee: China Jiliang University, Hangzhou (CN)

( * ) Notice: Subject to any disclaimer, the term of this patent is extended or adjusted under 35 U.S.C. 154(b) by 28 days.

(21) Appl. No.: 16/418,993

(22) Filed: May 21, 2019

(65) Prior Publication Data
US 2019/0351543 A1    Nov. 21, 2019

(30) Foreign Application Priority Data
May 21, 2018   (CN) .......................... 2018 1 0527980

(51) Int. Cl.
| | |
|---|---|
| *B25J 9/10* | (2006.01) |
| *B25J 11/00* | (2006.01) |
| *B25J 19/06* | (2006.01) |
| *B25J 9/00* | (2006.01) |
| *B25J 9/14* | (2006.01) |
| *B25J 17/00* | (2006.01) |

(52) U.S. Cl.
CPC ............... *B25J 9/10* (2013.01); *B25J 9/0045* (2013.01); *B25J 9/144* (2013.01); *B25J 11/00* (2013.01); *B25J 19/068* (2013.01); *B25J 17/00* (2013.01)

(58) Field of Classification Search
CPC . B25J 9/10; B25J 19/068; B25J 9/0045; B25J 9/144; B25J 11/00; B25J 17/00; F16F 9/53; A61F 2002/5004
See application file for complete search history.

(56) References Cited

U.S. PATENT DOCUMENTS

| | | | |
|---|---|---|---|
| 7,232,016 B2 * | 6/2007 | Namuduri ................. | F16F 9/53 188/267.1 |
| 10,080,697 B2 * | 9/2018 | Swift .................... | A61H 1/0266 |
| 2015/0285326 A1 * | 10/2015 | Battlogg ................ | B60N 2/501 188/267.2 |

* cited by examiner

*Primary Examiner* — Jeremy R Severson
(74) *Attorney, Agent, or Firm* — Wayne & Ken, LLC; Tony Hom

(57) ABSTRACT

A bionic robot and a spine apparatus thereof. Magnetorheological fluids are filled in the cavity, the first tube and the second tube to actuate the first end of the piston rod, so that the piston rod is actuated to move along the axial direction of the cavity. The excitation coil is wound around the first tube. When the controller provides a variable current for the excitation coil, the excitation coil produces a variable magnetic field at the first tube, thereby causing a magnetorheological effect that the magnetorheological fluid is in low liquidity and high viscosity. Then, the transmission speed of the piston rod is changed, which is presented as a damping characteristic, reducing the pause and transition in the spine apparatus, and improving the flexibility and the bionic performance of the robot.

9 Claims, 4 Drawing Sheets

BIONIC ROBOT AND SPINE APPARATUS THEREOF

CROSS-REFERENCE TO RELATED APPLICATIONS

This application claims the benefit of priority from Chinese Patent Application No. CN201810527980.9, filed on May 21, 2018. The content of the aforementioned application, including any intervening amendments thereto, is incorporated herein by reference in its entirety.

TECHNICAL FIELD

The present invention relates to robots, and in particular to a bionic robot and a spine apparatus thereof.

BACKGROUND OF THE INVENTION

Bionic robots have been widely used in special environments with strong environmental adaptability. Compared to ordinary robots, the bionic robot can complete special tasks faster, more accurately and more stably, which is closely associated with both of their complex motor neurons and body structures. As the central axis of all mammalian bodies, the spine is the motion center of the body structure and the transmission hub of the force. When the robot runs, the spine can increase the range of motion and the energy for absorbing ground impact. In recent years, most of the bionic robots studied are of rigid bodies and passively flexible spines, for example, the passive spine is formed by connecting upper and lower limbs with an elastic body. However, the spine deformation cannot be actively controlled during the steering and running of the robot, thereby limiting the motion speed of the robot to a certain extent. Moreover, the spine of the existing robot can only be bent in one direction, which is much worse than an animal's spine. At present, there is no bionic robot with a multi-degree of freedom spine and a flexible body. Therefore, it is of great significance to further research the application of the bionic spine in the field of the bionic robot.

According to the search of the current literature, Chinese Patent No. CN 106956247A discloses an actively flexible spine of a series-parallel quadruped robot, including a base, a ball joint, a rotary connector, a non-fixed axis intervertebral disc and a plurality of linear actuators. One end of the linear actuator is connected to the non-fixed axis intervertebral disc via the ball joint, and the other end of the linear actuator is connected to the base via the rotary connector. The upper and lower sections of the spine are fixedly connected by two non-fixed axis intervertebral discs in a dislocation manner. In the above invention, it is needed to provide a digital control signal corresponding to the linear actuator, so that a stable rhythm signal can be outputted. The spine of a creature is an analog signal of neurons and the neurons are stimulated and suppressed by one another, i.e., there are couplings among the neurons. When the rhythm signals are outputted by the digital signals, pause and transition in the rhythm signals that are difficult to adjust occur. Thus, the bionic performance of the invention is not strong.

Therefore, how to reduce the pause and transition in the spine apparatus and improve the flexibility and bionic performance of the robot have become the technical problems to be solved.

SUMMARY OF THE INVENTION

The present invention aims to reduce the pause and transition in a spine apparatus and improve the flexibility and the bionic performance of a robot.

In a first aspect, the present invention provides a spine apparatus of a bionic robot, comprising an upper base, a lower base, and a plurality of actuating devices provided between the upper base and the lower base and configured to actuate a motion of the upper base and/or the lower base;

wherein each of the plurality of actuating devices comprises:

a linear actuator comprising a cavity and a piston rod, wherein a first end of the piston rod is provided in the cavity, and the piston rod reciprocates along an axial direction of the cavity under an external force; the cavity comprises a first tube and a second tube that are respectively in fluid communication with an inner cavity of the cavity, and are respectively provided at two sides of the first end of the piston rod;

a magnetorheological fluid filled in the cavity and driving, together with the first tube and the second tube, the first end of the piston rod to move along the axial direction of the cavity;

a control valve connected to the first tube and the second tube for adjusting a flow rate of the magnetorheological fluid in the first tube and the second tube;

an excitation coil wound around the first tube; and a controller connected to the excitation coil and the control valve and configured to provide the control valve with a flow rate control signal for indicating and adjusting the flow rate of the magnetorheological fluid in the first tube and the second tube; wherein the controller is further provided a variable current for the excitation coil, so that the excitation coil produces a variable magnetic field at the first tube.

Optionally, a second end of the piston rod is coupled with the upper base via a first rotary joint. A first side of the cavity away from the second end of the piston rod is coupled with the lower base via a second rotary joint.

Optionally, the first rotary joint is a ball joint, and the second rotary joint is a hinge joint.

Optionally, the controller includes a current limiting resistor connected in series with the excitation coil; and the current limiting resistor and the excitation coil connected in series are provided at two ends of a variable-voltage transformer.

Optionally, the controller further includes:

a first operational amplifier, where a non-inverting input terminal and a non-inverting output terminal of the first operational amplifier are connected in series by a first variable resistor and a first variable capacitor, so that a sinusoidal self-oscillation is generated; the non-inverting input terminal of the first operational amplifier is grounded by a first resistor; an inverting input terminal of the first operational amplifier is grounded by a first current limiting resistor; and a first feedback resistor is provided between the inverting input terminal and the inverting output terminal of the first operational amplifier which are connected in series;

a second operational amplifier, where a non-inverting input terminal and a non-inverting output terminal of the second operational amplifier are connected in series by a second variable resistor and a second variable capacitor, so that the sinusoidal self-oscillation is generated; the non-inverting input terminal of the second operational amplifier is grounded by a second resistor; an inverting input terminal of the second operational amplifier is grounded by a second current limiting resistor; and a second feedback resistor is provided between the inverting input terminal and the inverting output terminal of the second operational amplifier which are connected in series;

a first capacitor, where a first end of the first capacitor is arranged between the non-inverting input terminal of the first operational amplifier and the first resistor;

a second capacitor, where a first end of the second capacitor is arranged between the non-inverting input terminal of the second operational amplifier and the second resistor; a second end of the first capacitor is connected to a second end of the second capacitor; and a coupling resistor, where the coupling resistor is arranged between a juncture of the second end of the first capacitor and the second end of the second capacitor and the ground;

A potential difference between the junction of the second end of the first capacitor and the second end of the second capacitor and the non-inverting input terminal of the second operational amplifier is configured to provide a variable voltage.

Optionally, the controller further includes a coupling inductor connected in series with the current limiting resistor and the excitation coil.

Optionally, the actuating devices are coupled with one another via respective coupling inductors.

Based on the first aspect, the present invention further provides a bionic robot, including:

a main body;

the spine apparatus of any one of the spine apparatus in the first aspect provided at the main body; and a fluid source configured to provide the magnetorheological fluid for the spine apparatus of the bionic robot.

The technical solutions of the present invention have the following advantages.

In the present invention, the magnetorheological fluid is filled in the cavity, the first tube and the second tube to actuate the first end of the piston rod, so that the piston rod is actuated to move along the axial direction of the cavity. Since the excitation coil is wound around the first tube, it produces a variable magnetic field at the first tube when the controller provides a variable current for the excitation coil, thereby causing a magnetorheological effect that the magnetorheological fluid is in low liquidity and high viscosity. Then, the transmission speed of the piston rod is changed, which is presented as a damping characteristic, reducing the pause and transition in the spine apparatus, and improving the flexibility and the bionic performance of the robot.

As an alternative technical solution, when the first operational amplifier and the second operational amplifier are coupled by the coupling resistor, the potential difference between the junction of the second end of the first capacitor and the second end of the second capacitor and the non-inverting input terminal of the second operational amplifier provides a variable voltage. Compared to the method of providing a digital control signal corresponding to the linear actuator in the prior art, the present invention adopts an oscillation signal generated by a central pattern generator as the control signal, and the control signal is an analog signal that well simulates the characteristics of the rhythm motion of the mammalian spine. In addition, since the resistor and capacitor are arranged in a series-parallel connection, the oscillation signal outputted by the controller are adjustable.

BRIEF DESCRIPTION OF THE DRAWINGS

In order to better illustrate the embodiments and the technical solutions of the present invention, the drawings used in the embodiments or the description of the prior art are briefly introduced below. Obviously, the drawings in the following description are only some embodiments of the present invention, and those skilled in the prior art can obtain other drawings based on these drawings without any inventive effort.

DETAILED DESCRIPTION OF EMBODIMENTS

Figure 1:
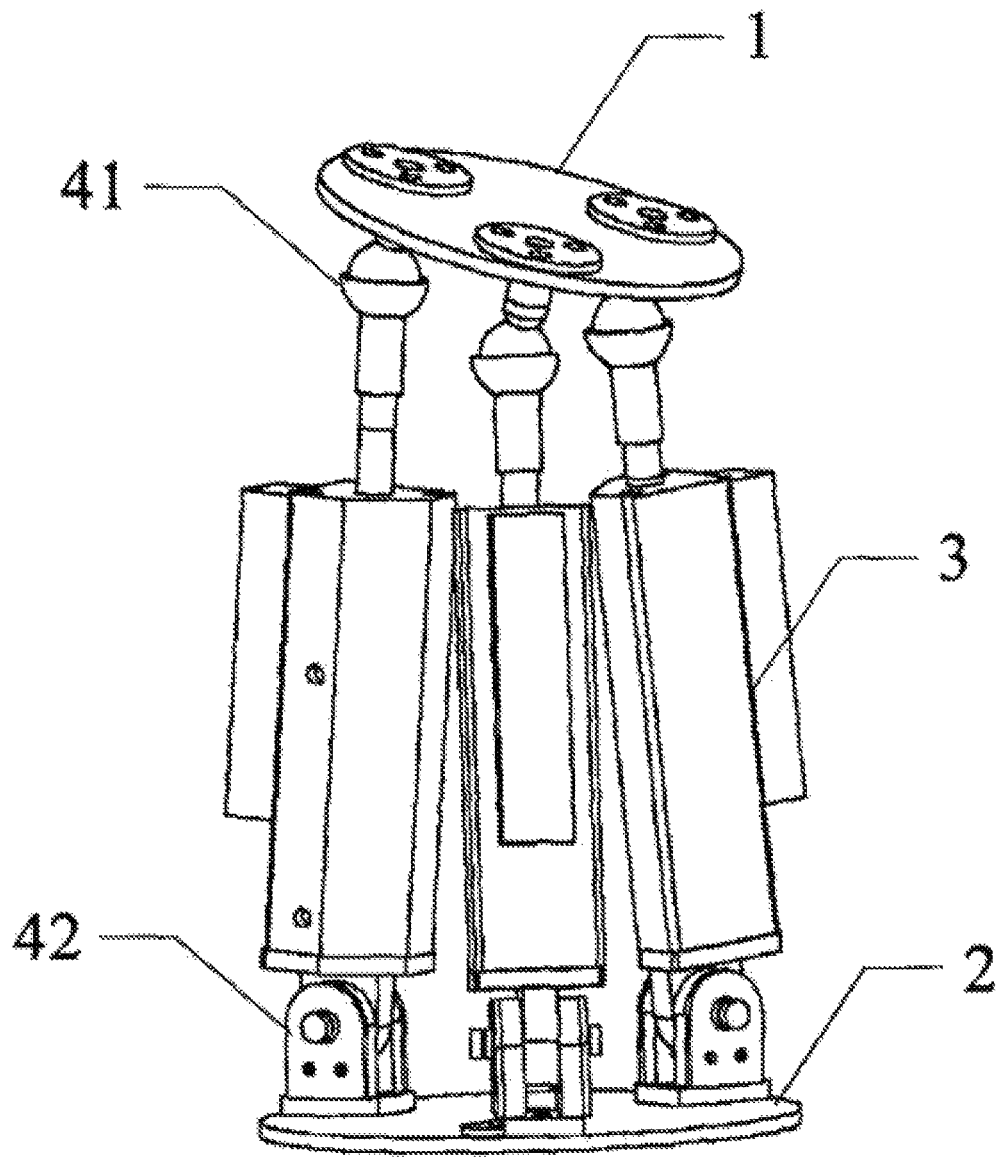
FIG. 1 is a schematic diagram of a spine apparatus of a bionic robot according to an embodiment of the present invention.

The technical solutions of the present invention will be clearly and completely described in the following with reference to the accompanying drawings. It is obvious that the embodiments described below are a part of the embodiments of the present invention, but not all of the embodiments. All other embodiments obtained by those skilled in the art based on the embodiments of the present invention without creative efforts are within the scope of the present invention.

In the description of the present invention, it should be noted that terms "center", "up", "down", "left", "right", "vertical", "horizontal", "inner", "outer" and the like refer to orientation or positional relationship shown in the drawings, which are merely for better description of the invention and do not require that the invention must be in specific positional configurations with specific operations. They are not intended to limit the invention. In addition, terms "first", "second" and "third" are only used for illustrative purpose, and are not to be understood as indicating or implying the relative importance.

In the description of the present invention, it should be noted that terms "installation", "connected with", "connection" should be considered in a broad sense, for example, it may be a fixed connection, a detachable connection or an integral connection. It may further be a mechanical connection or an electrical connection. It may further be a direct connection or an indirect connection via an intermediate part. It may further be an internal connection between two components, a wireless connection or a wired connection. The specific meaning of the above terms in the present invention can be understood in a specific case by those skilled in the prior art.

Furthermore, the technical features of the embodiments in the present invention may be combined as long as there is no conflict therebetween.

Figure 2:
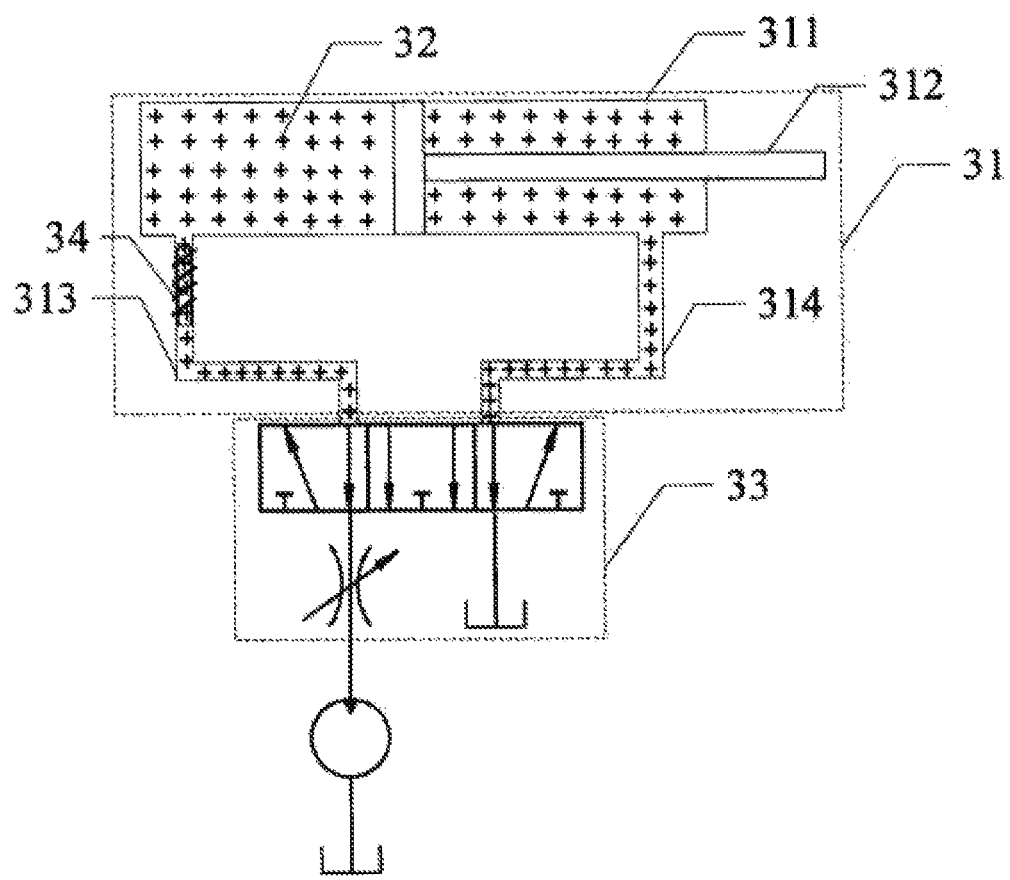
FIG. 2 is a schematic diagram of an actuating device according to an embodiment of the present invention.

In order to reduce the pause and transition in the spine apparatus, and improve the flexibility and the bionic performance of the robot, the present embodiment provides a spine apparatus of a bionic robot as shown in FIGS. 1 and 2, wherein FIG. 1 is a schematic diagram showing a structure of the spine apparatus of the bionic robot according to the present embodiment, and FIG. 2 is a schematic diagram of an actuating device according to the present embodiment. A spine apparatus of a bionic robot includes an upper base 1, a lower spine base 2 and a plurality of actuating devices 3.

The existing spine base structure is adopted to form the upper base 1 and the lower base 2.

The plurality of the actuating devices 3 are provided between the upper base 1 and the lower base 2, and are configured to actuate the upper base 1 and/or the lower base 2. In practical use, the actuating devices 3 move with different displacements, and due to the displacement differences among the actuating devices 3, the upper base 1 and/or the lower base 2 may be actuated to be deflected to a certain degree or to be translated.

In an embodiment, as shown in FIG. 2, the actuating device includes a linear actuator 31, a magnetorheological fluid 32, a control valve 33, an excitation coil 34 and a controller.

The linear actuator 31 includes a cavity 311 and a piston rod 312, and a first end of the piston rod 312 is provided in the cavity 311. The piston rod 312 reciprocates along an axial direction of the cavity 311 under an external force.

In an embodiment, the cavity includes a first tube 313 and a second tube 314. The first tube 313 and the second tube 314 are respectively in fluid communication with the cavity, and are respectively provided at two sides of the first end of the piston rod 312.

The magnetorheological fluid 32 is filled in the cavity 311, the first tube 313 and the second tube 314, and is configured to actuate the first end of the piston rod 312, so that the piston rod 312 is actuated to move along the axial direction of the cavity 311. Specifically, when there is a fluid difference between the first tube 313 and the second tube 314, the piston rod 312 is actuated to move from a side with higher pressure to the other side with lower pressure.

The control valve 33 is connected with the first tube 313 and the second tube 314, and is configured to adjust a flow rate of the magnetorheological fluid in the first tube 313 and the second tube 314. In an embodiment, the control valve 33 can be a valve body such as a throttling valve, a solenoid valve and/or a multi-position and multi-port solenoid valve, and the flow rate of the magnetorheological fluid in the first tube 313 and the second tube 314 is adjusted by controlling the turn-on and turn-off of the valve body.

The excitation coil 34 is wound around the first tube 313. In an embodiment, the excitation coil 34 produces a variable magnetic field at the first tube 313 under excitation of a variable current. It should be noted that the excitation coil can also be wound at the second tube 314 in other embodiments, which should be considered as a direct replacement in a common means of the present invention, and should fall within the scope of the present invention.

The controller (not marked in the appended drawings) is connected to the excitation coil 34 and the control valve 33, and is configured to provide the control valve with a flow rate control signal for indicating and adjusting the flow rate of the magnetorheological fluid in the first tube 313 and the second tube 314. The controller is further configured to provide a variable current for the excitation coil 34, so that the excitation coil 34 produces a variable magnetic field at the first tube 313.

As shown in FIG. 1, in an embodiment, a second end of the piston rod 312 is coupled with the upper base 1 via a first rotary joint 41, and a first side of the cavity 311 away from the second end of the piston rod 312 is coupled with the lower base 2 via a second rotary joint 42. Specifically, the first rotary joint 41 is a ball joint, and the second rotary joint 42 is a hinge joint.

Figure 3:
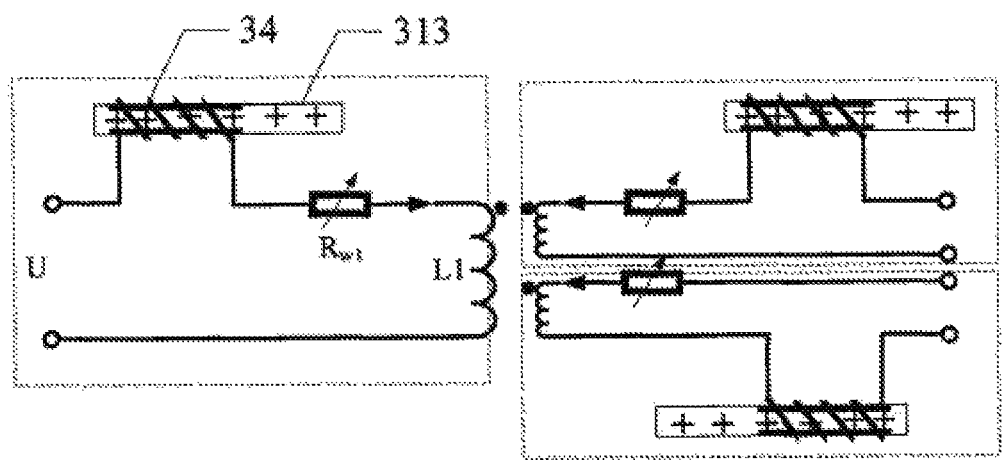
FIG. 3 is a schematic diagram showing the coupling connection of the actuating devices according to an embodiment of the present invention.

In an embodiment, as shown in FIG. 3, a schematic diagram showing a coupling structure among the actuating devices is illustrated. The controller of the present invention includes a current limiting resistor $R_{w1}$ connected in series with the excitation coil 34. The current limiting resistor $R_{w1}$ and the excitation coil 34 connected in series are provided at two ends of a variable-voltage transformer U. In the present embodiment, the excitation coil 34 is excited by the variable-voltage transformer to form a variable magnetic field.

Figure 4:
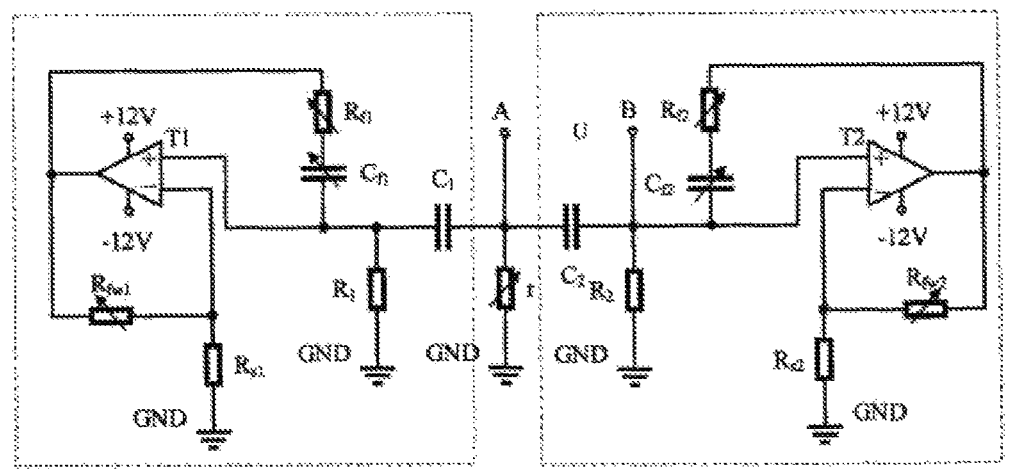
FIG. 4 is a schematic diagram showing a circuit formed with variable voltage according to an embodiment of the present invention.

In an embodiment, as shown in FIG. 4, a circuit formed with variable voltage is illustrated. The controller further includes a first operational amplifier T1, a second operational amplifier T2, a first capacitor $C_1$, a second capacitor $C_2$ and a coupling resistor r.

A non-inverting input terminal and a non-inverting output terminal of the first operational amplifier T1 are connected in series by a first variable resistor $R_{f1}$ and a first variable capacitor $C_{f1}$, so that a sinusoidal self-oscillation is generated. In an embodiment, the non-inverting input terminal of the first operational amplifier T1 is grounded by a first resistor $R_1$. An inverting input terminal of the first operational amplifier T1 is grounded by a first current limiting resistor $R_s$. A first feedback resistor $R_{fw1}$ is provided between the inverting input terminal and an inverting output terminal of the first operational amplifier T1 which are connected in series. In an embodiment, the first operational amplifier T1 can be powered by an external power supply or a power module provided by the controller, for example, the first operational amplifier T1 can be powered by a ±12V supply. It should be noted that the embodiment is not intended to limit the voltage of the supply source of the first operational amplifier T1, and specifically, the voltage is determined by the specific operating voltage of the first operational amplifier T1.

A non-inverting input terminal and a non-inverting output terminal of the second operational amplifier T2 are connected in series by a second variable resistor $R_{f2}$ and a second variable capacitor $C_{f2}$, so that a sinusoidal self-oscillation is generated. In this embodiment, the non-inverting input terminal of the second operational amplifier T1 is grounded by a second resistor $R_2$. An inverting input terminal of the second operational amplifier T2 is grounded by a second current limiting resistor $R_{s2}$. A second feedback resistor $R_{fw2}$ is provided between the inverting input terminal and an inverting output terminal of the second operational amplifier T2 which are connected in series. In an embodiment, the second operational amplifier T2 can be powered by an external power supply or a power module provided by the controller, for example, the second operational amplifier T2 can be powered by a ±12V supply. It should be noted that the embodiment is not intended to limit the voltage of the supply source of the second operational amplifier T2, and specifically, the voltage is determined by the specific operating voltage of the second operational amplifier T2.

In an embodiment, a first end of the first capacitor $C_1$ is arranged between the non-inverting input terminal of the first operational amplifier T1 and the first resistor $R_1$. A first end of the second capacitor $C_2$ is arranged between the non-inverting input terminal of the second operational amplifier T2 and the second resistor $R_2$. A second end of the first capacitor $C_1$ is connected to the second end of the second capacitor $C_2$. In this embodiment, the coupling resistor r is arranged between a juncture of the second end of the first capacitor $C_1$ and the second end of the second capacitor $C_2$ and the ground. A potential difference between the junction A of the second end of the first capacitor $C_1$ and the second end of the second capacitor $C_2$ and the non-inverting input terminal B of the second operational amplifier is configured to provide a variable voltage U. In this embodiment, the variable voltage U is a sinusoidal oscillation signal.

In the technical solutions of this embodiment, the first operational amplifier T1 and the second operational amplifier T2 achieves the coupling of two RC circuits to form a central pattern generator and then provide the variable voltage U. The coupling strength of the two RC oscillation circuits can be changed by changing the resistance of the coupling resistor r. The frequency of an oscillator can be changed by changing the product of a resistance and a capacitance of the first operational amplifier T1 and the second operational amplifier T2 on the non-inverting input terminal, i.e., the frequency of the oscillator can be changed by changing the product of the resistance of the first variable resistor Rf1 and the capacitance of the first variable capacitor $C_{f1}$ and/or the product of the resistance of the second variable resistor $R_{f2}$ and the capacitance of the second variable capacitor $C_{f2}$. The resistance of the first variable resistor $R_{f1}$ and/or the second variable resistor $R_{f2}$ are adjusted to adjust an amplitude of the oscillation signal. The variable voltage U outputted between nodes A and B is a sinusoidal oscillation signal, and the oscillatory conditions of the RC hardware oscillation circuit are Rfw1>2Rs1>2r and Rfw2>2Rs2>2r.

In an embodiment, when the spine apparatus is actuated by the plurality of actuating devices, the actuating devices are coupled with one another. Specifically, as shown in FIG. 3, the controller further includes a coupling inductor L1 which is connected in series with the current limiting resistor $R_{w1}$ and the excitation coil 34. In the embodiment, the actuating devices are coupled with one another via respective coupling inductors. A case where three actuating devices are coupled with one another is illustrated as shown in FIG. 3.

The magnetorheological fluid is a suspension of a mixture of tiny magnetic particles with high permeability and low hysteresis and particles with non-magnetic permeability. The magnetorheological effect occurs under the action of a magnetic field. The suspension presents a Newtonian fluid characteristic with low viscosity under a zero magnetic field, and presents a Bingham fluid characteristic with high viscosity and low liquidity under the action of a strong magnetic field.

In an embodiment, as shown in FIGS. 1, 2 and 3, three actuating devices are provided as an example. The working process of the spine apparatus of the bionic robot includes the following steps: control valves 33 such as the throttling valve and solenoid valve are controlled, so that the linear actuator 3 is evenly reciprocated. When the spine apparatus is reciprocated, oscillation signals (variable voltage U) produced by the oscillation circuit of the controllers are connected to the excitation coil 34 around the first tube 313 of the linear actuator. The variable current flowing through the excitation coil 34 generates a magnetic field at the interior of or near the excitation coil 34, and the variable current produces a variable magnetic field. The magnetorheological field is presented as low fluidity and high viscosity under the action of the strong magnetic field, and the variable magnetic field causes changes of the viscosity of the magnetorheological fluid. The flow rate of the magnetorheological fluid in the first tube 313 reduces as the viscosity thereof increases, and the change of the viscosity changes the transmission speed of the piston rod 312 in the linear actuator, which is presented as a damping characteristic, so that a flexible control is achieved.

In an aspect, the present invention further provides a bionic robot, including a main body, the spine apparatus in above embodiments and a fluid source. The spine apparatus is provided at the main body, and the fluid source is configured to provide the magnetorheological fluid for the spine apparatus.

In the embodiment, the magnetorheological fluid is filled in the cavity, the first tube and the second tube to actuate the first end of the piston rod, so that the piston rod is actuated to move along the axial direction of the piston rod. The excitation coil is wound around the first tube. When the controller provides a variable current for the excitation coil, the excitation coil produces a variable magnetic field at the first tube, thereby causing a magnetorheological effect that the magnetorheological fluid is in low liquidity and high viscosity. Then, the transmission speed of the piston rod is changed, which is presented as a damping characteristic, reducing the pause and transition in the spine apparatus, and improving the flexibility and the bionic performance of the robot.

As an alternative technical solution, when the first operational amplifier and the second operational amplifier are coupled by the coupling resistor, the potential difference between the junction of the second end of the first capacitor and the second end of the second capacitor and the non-inverting input terminal of the second operational amplifier provides a variable voltage. Compared to the method of providing a digital control signal corresponding to the linear actuator in the prior art, the present invention adopts an oscillation signal generated by the central pattern generator as the control signal, and the control signal is an analog signal that well simulates the characteristics of the rhythm motion of the mammalian spine. In addition, the resistors and capacitors are arranged in a series-parallel connection, so that the oscillation signal outputted by the controller is adjustable.

Obviously, the above embodiments are just for illustrative, but not to limit the present invention. Other variations or modifications in various forms can be made by those skilled in the prior art in light of the above description. There is no need and no way to list all embodiments of the present invention. Obvious changes or variations based on the invention are still within the scope of the present invention.

What is claimed is:

1. A spine apparatus of a bionic robot, comprising:
    an upper base,
    a lower base, and
    a plurality of actuating devices provided between the upper base and the lower base, and configured to actuate a motion of the upper base and/or the lower base;
    wherein each of the plurality of actuating devices comprises:
    a linear actuator comprising a cavity and a piston rod, wherein a first end of the piston rod is provided in the cavity, and the piston rod reciprocates along an axial direction of the cavity under an external force; the cavity comprises a first tube and a second tube that are respectively in fluid communication with an inner cavity of the cavity, and are respectively provided at two sides of the first end of the piston rod;
    a magnetorheological fluid filled in the cavity and driving, together with the first tube and the second tube, the first end of the piston rod to move along the axial direction of the cavity;
    a control valve connected to the first tube and the second tube for adjusting a flow rate of the magnetorheological fluid in the first tube and the second tube;
    an excitation coil wound around the first tube; and a controller connected to the excitation coil and the control valve and configured to provide the control valve with a flow rate control signal for indicating and adjusting the flow rate of the magnetorheological fluid in the first tube and the second tube; wherein the controller is further provided a variable current for the excitation coil, so that the excitation coil produces a variable magnetic field at the first tube.

2. The spine apparatus of claim 1, wherein a second end of the piston rod is coupled with the upper base via a first joint; and a first side of the cavity away from the second end of the piston rod is coupled with the lower base via a second rotary joint.

3. The spine apparatus of claim 2, wherein the first rotary joint is a ball joint, and the second rotary joint is a hinge joint.

4. A bionic robot, comprising:
a main body,
the spine apparatus of claim 2 provided at the main body, and
a fluid source configured to provide the spine apparatus with the magnetorheological fluid.

5. The spine apparatus of claim 1, wherein the controller comprises a current limiting resistor connected in series with the excitation coil; and the current limiting resistor and the excitation coil connected in series are provided at two ends of a variable-voltage transformer.

6. The spine apparatus of claim 5, wherein the controller further comprises:
a first operational amplifier, wherein a non-inverting input terminal and a non-inverting output terminal of the first operational amplifier are connected in series by a first variable resistor and a first variable capacitor, so that a sinusoidal self-oscillation is generated; the non-inverting input terminal of the first operational amplifier is grounded by a first resistor; an inverting input terminal of the first operational amplifier is grounded by a first current limiting resistor; and a first feedback resistor is provided between the inverting input terminal and the inverting output terminal of the first operational amplifier which are connected in series;
a second operational amplifier, wherein a non-inverting input terminal and a non-inverting output terminal of the second operational amplifier are connected in series by a second variable resistor and a second variable capacitor, so that the sinusoidal self-oscillation is generated; the non-inverting input terminal of the second operational amplifier is grounded by a second resistor; an inverting input terminal of the second operational amplifier is grounded by a second current limiting resistor; and a second feedback resistor is provided between the inverting input terminal and the inverting output terminal of the second operational amplifier which are connected in series;
a first capacitor, wherein a first end of the first capacitor is arranged between the non-inverting input terminal of the first operational amplifier and the first resistor;
a second capacitor, wherein a first end of the second capacitor is arranged between the non-inverting input terminal of the second operational amplifier and the second resistor; a second end of the first capacitor is connected to a second end of the second capacitor;
a coupling resistor; the coupling resistor is arranged between a juncture of the second end of the first capacitor and the second end of the second capacitor and the ground; and
a potential difference between the junction of the second end of the first capacitor and the second end of the second capacitor and the non-inverting input terminal of the second operational amplifier is configured to provide a variable voltage.

7. The spine apparatus of claim 5, wherein the controller further comprises a coupling inductor connected in series with the current limiting resistor and the excitation coil.

8. The spine apparatus of claim 7, wherein the plurality of actuating devices are coupled with one another via respective coupling inductors.

9. A bionic robot, comprising:
a main body,
the spine apparatus of claim 1 provided at the main body, and
a fluid source configured to provide the spine apparatus with the magnetorheological fluid.

* * * * *